United States Patent
Liu et al.

(10) Patent No.: US 12,085,512 B2
(45) Date of Patent: Sep. 10, 2024

(54) PROCESSING METHOD AND PROCESSING DEVICE

(71) Applicant: Lenovo (Beijing) Limited, Beijing (CN)

(72) Inventors: Wei Liu, Beijing (CN); Feng Xu, Beijing (CN); Lin Zhu, Beijing (CN); Dakun Yang, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 275 days.

(21) Appl. No.: 17/677,960

(22) Filed: Feb. 22, 2022

(65) Prior Publication Data
US 2023/0093531 A1 Mar. 23, 2023

(30) Foreign Application Priority Data
Sep. 22, 2021 (CN) .......................... 202111106934.X

(51) Int. Cl.
*G01N 21/88* (2006.01)
*G06T 7/00* (2017.01)
*G06T 7/73* (2017.01)

(52) U.S. Cl.
CPC ....... *G01N 21/8851* (2013.01); *G06T 7/0004* (2013.01); *G06T 7/73* (2017.01); *G01N 2021/8877* (2013.01); *G01N 2021/888* (2013.01); *G06T 2207/30141* (2013.01)

(58) Field of Classification Search
CPC ....... G01N 21/8851; G01N 2021/8877; G01N 2021/00; G01N 2021/888; G06T 7/0004; G06T 7/73; G06T 2207/30141
See application file for complete search history.

(56) References Cited

U.S. PATENT DOCUMENTS

| 11,423,531 B2* | 8/2022 | Cheng | G06F 18/2413 |
| 11,741,593 B2* | 8/2023 | Liu | G06V 10/70 |
| | | | 382/100 |

* cited by examiner

*Primary Examiner* — Hung V Nguyen
(74) *Attorney, Agent, or Firm* — ANOVA LAW GROUP, PLLC

(57) ABSTRACT

A processing method includes obtaining a processing image of a apparatus and performing a second processing on the processing image to generate a target image to analyze the target image according to a target defect detection method to realize defect detection of the apparatus. The processing image is obtained by performing a first processing on an initial image of the apparatus. The first processing includes performing scale processing on the initial image according to defect parameters corresponding to the initial image.

16 Claims, 5 Drawing Sheets

PROCESSING METHOD AND PROCESSING DEVICE

CROSS-REFERENCE TO RELATED APPLICATION

This application claims priority to Chinese Patent Application No. 202111106934.X, filed on Sep. 22, 2021, the entire content of which is incorporated herein by reference.

TECHNICAL FIELD

The present disclosure generally relates to the detection technology field and, more particularly, to a processing method and a processing device.

BACKGROUND

In an industrial defect detection system, an image of an object to be tested is obtained by an acquisition apparatus such as a camera. Then, the image is processed using an algorithm to perform defect detection on the image to determine whether a defect exists.

Currently, for performing defect detection, an ultra-clear camera is usually configured to photograph the object to obtain a high-resolution image to facilitate a computer to perform subsequent detection and analysis. However, when the image resolution is too high, speed is slow when the algorithm is used to detect the defect in the image, and the processing efficiency of the algorithm is insufficient. Thus, a machine with strong computation power and a streamlined algorithm is often required to meet the requirements of an automated production line.

SUMMARY

Embodiments of the present disclosure provide a processing method. The method includes obtaining a processing image of a apparatus and performing a second processing on the processing image to generate a target image to analyze the target image according to a target defect detection method to realize defect detection of the apparatus. The processing image is obtained by performing a first processing on an initial image of the apparatus. The first processing includes performing scale processing on the initial image according to defect parameters corresponding to the initial image.

Embodiments of the present disclosure provide a processing device, including an acquisition module and a calibration module. The acquisition module is configured to obtain a processing image of a apparatus. The processing image is obtained by performing a first processing on an initial image of the apparatus. The first processing includes performing scale processing on the initial image according to defect parameters corresponding to the initial image. The calibration module is configured to perform a second processing on the processing image to generate a target image to analyze the target image according to a target defect detection method to realize defect detection of the apparatus.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

Figure 1:
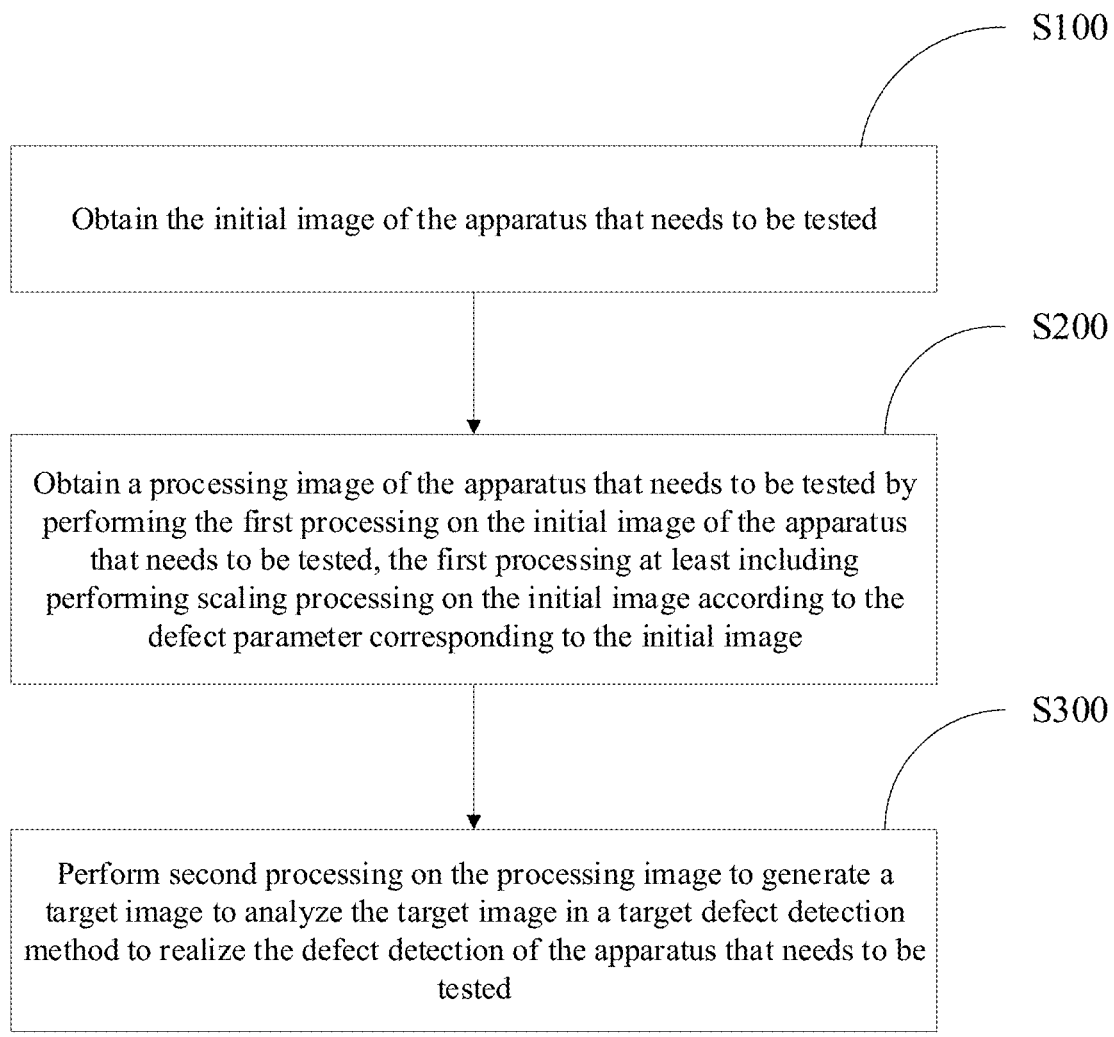
FIG. 1 illustrates a schematic flowchart of a processing method according to some embodiments of the present disclosure.

In order to make the purposes, technical solutions, and advantages of embodiments of the present disclosure more clear, the technical solutions of embodiments of the present disclosure are described in detail below with reference to the accompanying drawings of embodiments of the present disclosure. Apparently, described embodiments are some, but not all, embodiments of the present disclosure. Based on the described embodiments of the present disclosure, all other embodiments obtained by those of ordinary skill in the art without creative efforts are within the scope of the present disclosure.

Unless otherwise defined, technical or scientific terms used in the present disclosure shall have the ordinary meaning as understood by those of ordinary skill in the art. As used in the present disclosure, "first," "second," and similar words do not denote any order, quantity, or importance but are merely used to distinguish various components. Words like "comprise" or "include" mean that an apparatus or an article appearing before the word encompasses an apparatus or an article listed after the word and their equivalents, but do not exclude other apparatuses or articles. Words like "connected" or "coupled" are not limited to physical or mechanical connections but may include electrical connections, whether direct or indirect. "Up," "down," "left," "right," etc., are only used to indicate a relative positional relationship. When an absolute position of the described object changes, the relative positional relationship may also change accordingly.

To keep the following description of embodiments of the present disclosure clear and concise, in the present disclosure, a detailed description of well-known functions and components is omitted.

In the solution of embodiments of the present disclosure, a processing image of a apparatus that needs to be tested may be obtained by performing first processing on an initial image of the apparatus that needs to be tested. The first processing may at least include scaling the initial image according to a defect parameter corresponding to the initial image to reduce the resolution of the initial image. Thus, an image processing speed of an algorithm may be speeded up while the processing image is ensured to satisfy the clarity required by algorithm detection accuracy. Then, the processing image may be processed with second processing to generate a target image to calibrate the image to cause the target image to adapt to a requirement of the algorithm and improve the recognition efficiency of the algorithm. Thus, the target image may be facilitated to be analyzed by a target defect detection method to implement the defect detection on the apparatus that needs to be tested. A processing method of embodiments of the present disclosure is easy to operate and includes scaling the initial image easily according to the defect parameter to obtain the appropriate processing image. Thus, the recognition speed of the algorithm may be improved, while a reduction of the accuracy of the algorithm may be avoided. Then, the processing image may be further performed with the second processing to generate the target image to calibrate the processing image to significantly improve the recognition efficiency of a subsequent algorithm.

FIG. 1 illustrates a schematic flowchart of a processing method according to some embodiments of the present disclosure. As shown in FIG. 1, the processing method of embodiments of the present disclosure includes the following steps S200-S300.

At S200, a processing image of the apparatus that needs to be tested is obtained. The processing image is obtained by performing the first processing on the initial image of the apparatus that needs to be tested. The first processing at least includes performing scaling processing on the initial image according to the defect parameter corresponding to the initial image.

The step is intended to obtain the processing image with a suitable resolution for the apparatus that needs to be tested to improve the processing speed of the algorithm for the image when the detection and analysis are subsequently performed. The apparatus that needs to be tested may include an apparatus that needs defect detection, such as a cellphone, a tablet, etc., which is not limited in the present disclosure.

The defect parameter may include a characteristic parameter for accurately detecting a defect. The defect parameter may include a defect size and a sampling density. A defect area that needs to be detected is relatively small. Thus, to facilitate computation, the defect size can be measured in pixels, or another unit for computation, as long as the detection accuracy is not affected, which is not limited in the present disclosure.

In some embodiments, scaling the initial image according to the defect parameter corresponding to the initial image includes generating the defect parameter by using a defect prediction model according to a label parameter corresponding to the initial image and determining a scale ratio according to the defect parameter to perform scaling processing on the initial image according to the scale ratio. The defect parameter at least includes a downsampling number a, and the scale ratio is obtained based on $2^a$.

The defect prediction model may be pre-trained with defect samples. The defect samples may be selected according to common defects. After the common defects are classified according to sizes, the common defects may be input into the defect prediction model for identification and prediction. The defect model may be output according to the label parameters of the defect samples. The defect size and sampling density may be determined according to the defect model. The label parameters of the defect samples may be determined according to experience of technicians and then input. In an actual detection process, the defect size and the sampling density may also be provided by the technicians based on experience.

The downsampling number a may be determined according to the requirements of the used defect detection algorithm. For example, when a neural network algorithm is used, the downsampling number a may be 2. The larger the multiple used in the down-sampling process, the smaller the resolution of the image is. In order to prevent the initial image from being reduced too fast during the scaling process, in some embodiments of the present disclosure, the downsampling may be performed on the initial image subjected to a multiple of 2. When the downsampling multiple is 2, if the downsampling number is 1, the initial image may be reduced to ½ of the original size. If the downsampling number is 2, the initial image may be reduced to ¼ of the original size. If the downsampling number is a, then the initial image may be reduced to $½^a$ of the original size. Therefore, in order not to lose pixels of the defect area during the scaling process, the image scale ratio may be obtained based on $2^a$.

In some embodiments, the defect parameters may further include the defect size and the sampling density. In some embodiments, the scale ratio for the initial image may be calculated using the following formula (1):

$$\text{Ratio} = 2^a * S.D/F.S \quad (1)$$

In formula (1), Ratio denotes the scale ratio, a denotes the downsampling number, S.D denotes the sampling density, and F.S denotes the defect size.

TABLE 1

The scale factor of the initial image by the processing method of embodiments of the present disclosure with different defect parameters

| Resolution of the initial image | F.S | S.D | Ratio | Resolution of the processing image | Scale factor |
|---|---|---|---|---|---|
| 5472*3648 | 40 | 3 | 0.15 | 820.8*547.2 | 44 |
| 5472*3648 | 40 | 6 | 0.3 | 1641.6*1094.4 | 11 |
| 5472*3648 | 60 | 3 | 0.1 | 547.2*364.8 | 100 |
| 5472*3648 | 60 | 6 | 0.2 | 1094.4*729.6 | 25 |
| 5472*3648 | 80 | 3 | 0.075 | 410.4*273.6 | 177 |

Table 1 shows the scale factor after the initial image is performed with the scaling processing by the processing method of embodiments of the present disclosure with different defect parameters. The downsampling number a is 1. For example, as shown in the first row of Table 1, the resolution of the initial image is 5472*3648, the defect size F.S in the defect parameter is 40 pixels, and the sampling density S.D is selected as sampling every 3 pixels. Then, the Ratio is calculated to be 0.15 through the formula (1). That is, a length and a width of the initial image are both reduced to 0.15 times the size of the initial image. Thus, the scale factor of the initial image may reach 44. According to the experience of the technicians, by setting the sampling density S.D to 3 or 6, pixels of the defect area may not lose too much after scaling, so as to ensure that the accuracy of the subsequent defect detection algorithm does not decrease. As shown in Table 1, when the sampling density S.D is 3 or 6, and the defect size F.S is small, the effect on the scale factor is relatively small. When the defect size F.S is large, for example, 80 pixels, the effect on the scale factor is relatively large. Therefore, with the processing method of the present disclosure, the initial image may be performed with the scaling processing according to the defect parameter to reduce the resolution of the image and improve the speed of the algorithm. Moreover, the larger the defect size F.S of the defect area is, the larger the scale factor is, the smaller the resolution of the obtained processing image is, and the greater the speed of the algorithm may be improved.

Figure 2:
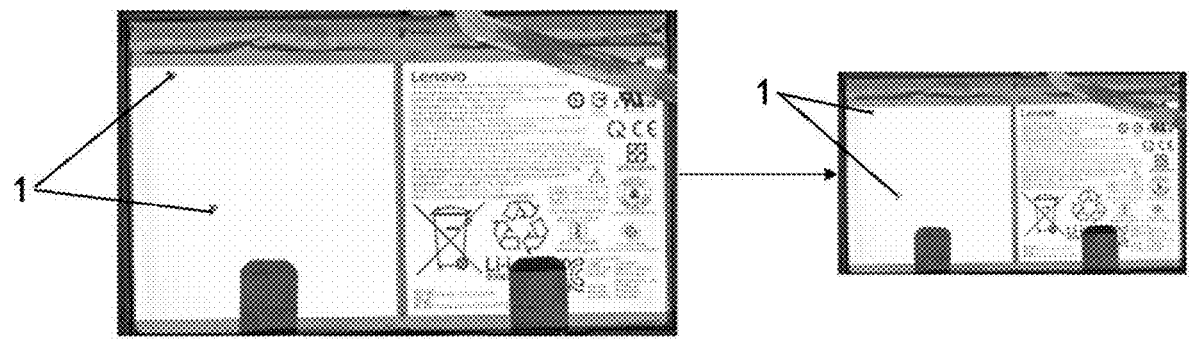
FIG. 2 illustrates a schematic diagram of a processing method according to some embodiments of the present disclosure.
Figure 3:
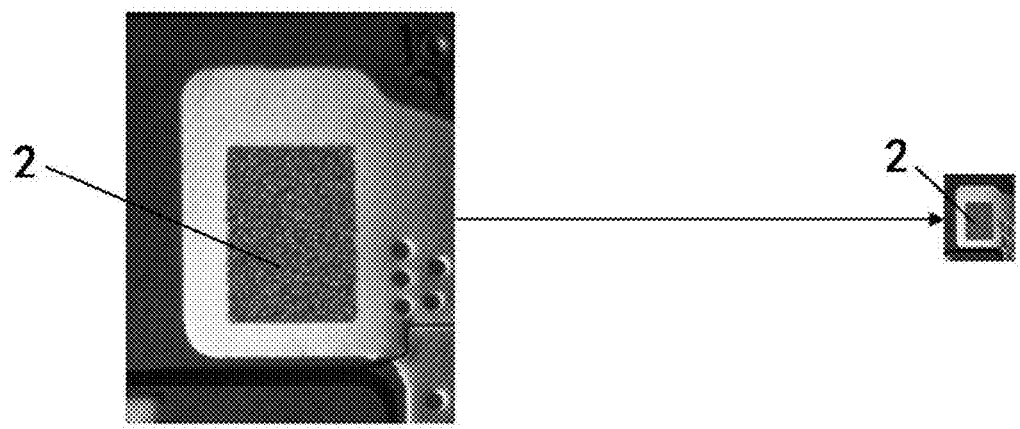
FIG. 3 illustrates another schematic diagram of a processing method according to some embodiments of the present disclosure.

FIG. 2 and FIG. 3 are schematic diagrams showing scale effects of defect areas with different defect sizes after the processing method of embodiments of the present disclosure. A detection element 1 of the defect area in FIG. 2 is a foreign body of a screw. The size of the screw is relatively small, and the size of the defect is also relatively small. The scale factor of the processing image obtained after the processing method of embodiments of the present disclosure is also relatively small. Thus, the processing efficiency of the algorithm may be improved, while the recognition accuracy of the algorithm is not affected. A detection element 2 of the defect area in FIG. 3 is foam. The size of the foam is relatively large. That is, pixels of the defect size are enough. The scale factor after the processing method of embodiments of the present disclosure is also relatively large so that the recognition accuracy of the algorithm is ensured to be not affected, while the processing efficiency of the algorithm may be greatly improved.

In the processing method of embodiments of the present disclosure, the initial image of the apparatus that needs to be tested may be performed with the scaling processing according to the defect parameter, which greatly reduces the initial image. The speed of the algorithm may be significantly improved, while the pixels of the defect area are ensured to satisfy the accuracy of the algorithm. Thus, a problem of false determination may not be caused by an unclear defect area of the image.

In some embodiments, before obtaining the processing image, the method further includes, at S100, obtaining the initial image of the apparatus that needs to be tested. That is, by performing image capturing on the apparatus that needs to be tested, the initial image is obtained. Step S100 includes the following steps S110 and S120.

At S110, the apparatus that needs to be tested is identified by using an apparatus identification model to determine a frame position of the apparatus that needs to be tested.

At S120, a photographing parameter of the acquisition apparatus is adjusted according to the frame position to obtain the initial image of the apparatus that needs to be tested in a range corresponding to the photographing parameter. The acquisition apparatus is configured to acquire an image of the apparatus that needs to be tested.

In the present disclosure, the apparatus identification model may be pre-trained with apparatus samples. The apparatus samples may be selected according to the apparatus that needs to be tested. For example, when defect detection needs to be performed on the cellphone, the cellphone may be used as an apparatus sample. By inputting a certain number of apparatus samples to the apparatus identification model to perform identification and prediction, the apparatus samples may be classified according to shapes and sizes of the apparatus samples and output a corresponding frame model. When results of the output frame model satisfy the predetermined accuracy, the apparatus identification model is trained.

In some embodiments, the apparatus identification model may perform identification on features of the apparatus that needs to be tested in the field of view. The apparatus identification model may further perform comparison in the established apparatus frame model according to the identified features such as the shape or the size, and when a matching frame model is determined, determine the frame position of the apparatus that needs to be tested according to the frame model.

In some embodiments, the acquisition apparatus may include an apparatus such as a camera that can obtain an image of the apparatus that needs to be tested, which is not limited in the present disclosure. After the frame position of the apparatus that needs to be tested is determined, the photographing parameter of the acquisition apparatus may be adjusted according to the frame position. By taking the camera as an example, during the photographing process, after the frame position of the apparatus that needs to be tested is obtained, a distance between the camera and the apparatus that needs to be tested may be adjusted to cause the frame of the apparatus that needs to be tested to fill the field of view of the camera. Then, parameters such as an aperture size, a shutter, an exposure compensation, and sensitivity may be adjusted accordingly according to the distance of the camera. After the photographing parameters are adjusted, the initial image of the apparatus that needs to be tested may be obtained.

In some embodiments, the photographing parameters of the acquisition device may be automatically adjusted according to the frame position of the apparatus that needs to be tested, so that the area surrounded by the frame of the apparatus that needs to be tested fills the image area as much as possible. Thus, the part of the image that needs to be detected for defects can also be maximized and have high definition, which is convenient to improve the accuracy of the analysis and the detection through the algorithm. Meanwhile, the photographing parameters may not need to be manually adjusted frequently so that the operation is convenient.

In some embodiments, when the acquisition apparatus does not store the initial image of the apparatus that needs to be tested, scaling the initial image according to the defect parameter corresponding to the initial image includes the following steps S210 and S220.

At S210, target resolution is determined according to the defect parameter corresponding to the previewed initial image.

At S220, the photographing parameter of the acquisition apparatus is adjusted according to the target resolution, so as to realize the scaling processing of the previewed initial image. The acquisition apparatus is configured to collect the image of the apparatus that needs to be tested.

In embodiments of the present disclosure, the acquisition apparatus may be configured to directly capture a processing image with a suitable resolution for the apparatus that needs to be tested. The camera may be taken as an example. During the photographing process, the distance between the camera and the apparatus that needs to be tested may be adjusted according to the method involved in steps S110 and S120, so that the frame of the apparatus that needs to be tested fills the field of view of the camera. Then, the parameters such as the aperture size, the shutter, the exposure compensation, the sensitivity, etc., may be adjusted correspondingly according to the distance of the camera to obtain a first preview image of the initial image of the apparatus that needs to be tested. Then, the target resolution may be calculated according to the defect parameters corresponding to the first preview image of the initial image. The defect parameters may be generated by using a defect prediction model or directly inputted according to the experience of the technicians to obtain the defect parameters. Then, the scale ratio may be calculated using the above formula (1), and the target resolution may be calculated according to the original resolution of the initial image and the scale ratio.

After determining the target resolution, the method may further include adjusting the distance between the camera and the apparatus that needs to be tested again according to the target resolution to cause the frame of the apparatus that needs to be tested to fill the field of view of the camera. The method may further include adjusting the parameters such as the aperture size, the shutter, the exposure compensation, the sensitivity, etc., correspondingly according to the adjusted distance of the camera and photographing after the adjustment is completed to obtain the scaled processing image of the apparatus that needs to be tested.

When the acquisition apparatus stores the initial image, performing the scaling processing on the initial image according to the defect parameters corresponding to the initial image includes the following steps S230 and S240.

At S230, a scale parameter is determined according to the defect parameter corresponding to the stored initial image.

At S240, the stored initial image is adjusted according to the scale parameter to realize the scale processing of the initial image.

In embodiments of the present disclosure, after the camera stores the initial image of the apparatus that needs to be tested, the scale processing may be performed on the initial image according to the corresponding defect parameters to obtain a processing image with a suitable resolution. The scale parameters may be first determined according to the defect parameters corresponding to the initial image. The defect parameters may be generated by the defect prediction model or directly inputted according to the experience of the technicians. After the defect parameters are determined, the scale ratio may be determined by the above formula (1). The length and the width of the initial image may be scaled according to the scale ratio to shrink the initial image to realize the scale processing of the initial image.

At S300, second processing is performed on the processing image to generate a target image to analyze the target image in a target defect detection method to realize the defect detection of the apparatus that needs to be tested.

In this step, after the processing image with the suitable resolution is obtained, the second processing may be performed on the processing image. In embodiments of the present disclosure, the processing image usually has a plurality of target detection elements. However, when the target detection elements are identified through some existing detection algorithms, position identification of some detection elements may not be accurate enough, or some detection elements cannot be identified, thereby missing some detection elements. Therefore, in subsequent defect detection, a result of the defect detection may be inaccurate due to these inaccurate detection elements or missing detection elements.

In embodiments of the present disclosure, the second processing may include matching the detected positions of the target detection elements through a first constraint model to further calibrate the positions of the target detection elements. Thus, algorithm accuracy of the analysis and processing of the image of the detection elements may be improved during the subsequent defect detection. When the detection elements of the processing image are matched using the first constraint model, if a position for marking a detection element appears, it can be determined that an unidentified target detection element may exist. Thus, a compensation operation may be performed on the unidentified target detection element.

In addition, continuing to take the camera as an example, during the photographing process, since a placement angle of the apparatus that needs to be tested cannot be consistent with a placement angle of a sample used in the algorithm detection, a certain deviation angle between the obtained initial image and the sample image may exist. An angle of the processing image may not be changed and may be the same as the angle of the initial image. In order to facilitate adaptation to subsequent algorithms and improvement of identification accuracy, the second processing may be performed on the angle of the processing image based on the sample image using a second constraint model to calibrate the angle of the processing image.

The processing method of embodiments of the present disclosure is easy to operate and includes easily scaling the initial image according to the defect parameters to obtain the suitable processing image, thereby improving the identification speed of the algorithm. Meanwhile, with the processing method, reduction of the accuracy of the algorithm may be avoided. The processing method further includes performing the second processing on the processing image to generate the target image to calibrate the processing image. Thus, the recognition efficiency of the subsequent algorithms may be significantly improved.

In some embodiments, the above-mentioned step S300 may include the following steps S311 and S312.

At S311, element identification is performed on the processing image to determine the positions of at least two target detection elements.

At S312, endpoint matching is performed on the positions of the at least two target detection elements by using the first constraint model to determine the positions of all the target detection elements on the processing image.

In embodiments of the present disclosure, the positions of the target detection elements may be further calibrated using the first constraint model. For a detection apparatus, a position of a target detection element that needs to be detected is determined. The technicians may establish one or more geometric constraint models according to the position of the target detection element. In some embodiments, the first constraint model may include one or more geometric constraint models that include all the target detection elements.

When element identification is performed on the processing image, positions of at least two target detection elements may be determined on the processing image by using some current detection algorithms of the detection elements to perform calculation according to some identified characteristic elements. Then, endpoint matching may be performed on the positions of the at least two target detection elements using the endpoints of the first constraint model. Thus, the positions of all target detection elements may be determined on the processing image.

In some embodiments, performing endpoint matching on the positions of the at least two target detection elements by using the first constraint model includes according to the positions of the at least two target detection elements, performing matching based on the endpoints of the first constraint model and the angles and side lengths corresponding to the endpoints. If the positions of the at least two target detection elements satisfy a relationship between the endpoints, angles, and side lengths, the processing image satisfies the first constraint model.

In some embodiments, according to the geometric shape of the first constraint model, the angles corresponding to the endpoints of the first constraint model and the side lengths between the endpoints may be determined. The positions of the two target detection elements may be matched according to the endpoints and the corresponding angle and side length characteristics. If the positions of the at least two target detection elements conform to the characteristics of the corresponding endpoints, angles, and side lengths, the positions of the at least two target detection elements are accurate, and the processing image conforms to the first constraint model.

In a matching process, based on the endpoints and the characteristics of the corresponding angles and side lengths, if a position of a target detection element deviates from a corresponding endpoint of the first constraint model, the position of the target detection element may be adjusted to the corresponding endpoint. Thus, the position of the target detection element may be further calibrated on the processing image to cause the processing image to conform to the first constraint model and improve the accuracy of the subsequent defect detection.

In some embodiments, when the processing image conforms to the first constraint model, performing endpoint matching on the positions of the at least two target detection elements by using the first constraint model to determine the positions of all the target detection elements on the processing image includes the following processes.

If an endpoint that cannot be matched with the at least two target detection elements exists in the first constraint model, an un-identified target detection element may be determined to exist in the processing image.

The un-identified target detection elements may be filled in according to the first constraint model to determine the positions of all the target detection elements on the processing image.

In some embodiments, the first constraint model includes positions of all elements that need to be detected. Therefore, when the processing image conforms to the first constraint model, based on the endpoints and the corresponding angle and side length characteristics, if an endpoint that cannot be matched with the at least two target detection elements in the first constraint model exists, a target detection element that is not identified by the detection algorithm of the detection elements may be determined to exist in the processing image. Then, a target detection element may be added to the corresponding position on the processing image according to the endpoint of the first constraint model that cannot be matched with the at least two target detection elements. As such, the target detection element that is missed may be marked on the processing image to fill in the target detection element. Thus, the positions of all the target detection elements may be determined on the processing image to improve the accuracy of the defect detection algorithm.

Figure 4:
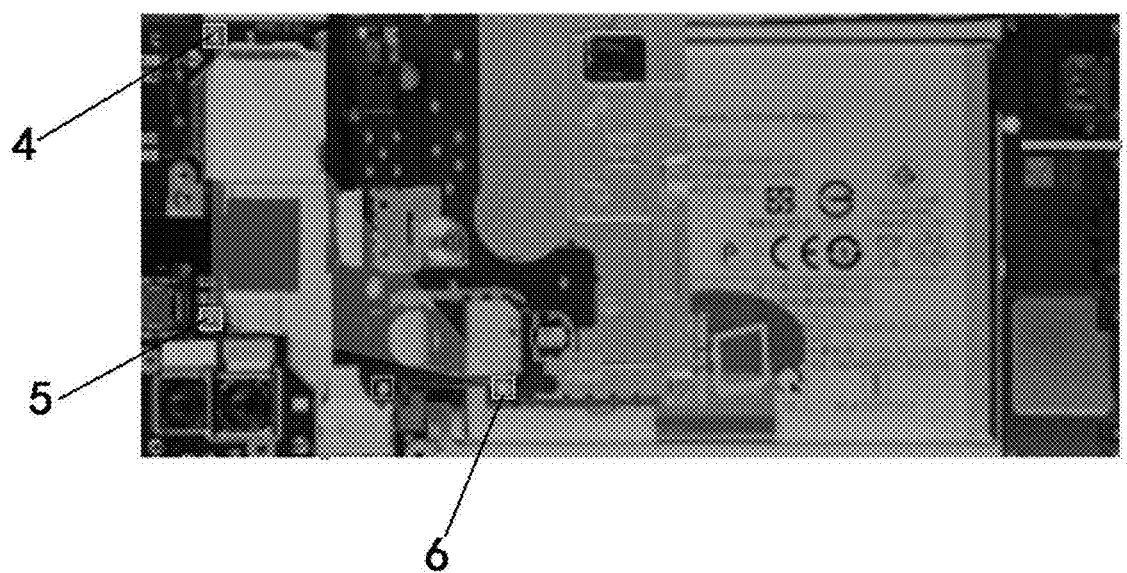
FIG. 4 illustrates still another schematic diagram of a processing method according to some embodiments of the present disclosure.

Exemplarily, as shown in FIG. 4, the first constraint model includes a triangle. The triangle may be corresponding to a triangle formed by the target detection elements 4, 5, and 6 in the figure. If the positions of the target detection elements 4, 5, and 6 in the processing image cannot be matched with or deviate from endpoints of the triangle of the first constraint model, the target detection element with deviation can be adjusted to the corresponding endpoint according to the position of the triangle to calibrate the position of the target detection element. The first constraint model may further include geometric constraint models established according to target detection elements in different positions or geometric constraint models of other shapes to calibrate the positions of all the target detection elements.

Further, in the matching process, if the target detection element 6 corresponding to an endpoint of the triangle in the first constraint model is not marked in the processing image, a target detection element that is not identified by the detection algorithm of the detection elements may be determined to exist in the processing image. Then, the target detection element may be added according to the position of the processing image corresponding to the endpoint of the triangle to mark the un-identified target detection element. As such, the positions of all the target detection elements may be determined in the processing image to improve the accuracy of the defect detection algorithm. The un-identified target detection element may be further detected and determined through other geometric constraint models of the first constraint model to obtain the positions of all the target detection elements.

In some embodiments, the above-mentioned step S300 includes performing element identification on the processing image to determine positions of at least three target detection components in the processing image (S321) and according to the positions of the at least three target detection elements, rotating a corresponding angle of the processing image based on the second constraint model to adjust the angle of the processing image (S322).

In some embodiments, the angle of the processing image may be adjusted based on the second constraint model, so that the angle of the processing image may be consistent with the second constraint model. When element identification is performed on the processing image, the positions of the at least three target detection elements may be determined in the processing image by using some current detection algorithms of the detection elements to perform calculation according to some identified characteristic elements. When the technician can establish one or more geometric constraint models according to the positions of the target detection elements, the second constraint model may determine a corresponding geometric constraint model according to the positions of the at least three target detection elements. Thus, the second constraint model can be adapted to the geometric shape formed by the positions of the at least three target detection elements. Parameter information of the positions of the at least three target detection elements may be obtained in the processing image. Calculation may be performed based on the parameter information of the corresponding endpoints of the at least three target detection elements in the second constraint model to obtain a first image rotation matrix of the processing image. The processing image may be rotated according to the first image rotation matrix to adjust the angle of the processing image.

In some embodiments, due to the accuracy of the algorithm of the detection elements, the positions of the at least three target detection elements in the processing image may have some errors, which leads to deviations between the angle of the adjusted processing image and the second constraint model. Therefore, in order to further calibrate the rotated processing image, the above step S300 further includes the following steps S323-S325.

At S323, the positions of the at least three target detection elements in at least two adjusted processing images are compared with the second constraint model to obtain deviation angles between the at least two adjusted processing images and the second constraint model.

At S324, a mean value of the deviation angles is calculated according to the deviation angles, and corresponding weights are set for the corresponding processing images according to magnitudes of the deviation angles.

At S325, each adjusted processing image is rotated again according to the mean deviation angle and the weight to generate the target image.

In some embodiments, the angle of the rotated processing image may be further calibrated.

When only one rotated processing image is provided, parameter information of the positions of the at least three target detection elements may be obtained in the adjusted processing image. The parameter information may be compared with the parameter information of the endpoints of the second constraint model to obtain the deviation angle between the adjusted processing image and the second constraint model. A corresponding weight may be determined according to the deviation angle. The weight may be determined according to the experience of the technicians. As such, when a second image rotation matrix of the adjusted processing image is calculated, the adjusted processing image may be rotated again according to the second image rotation matrix and the weight to generate the target image.

When at least two adjusted processing images are included, position parameter information of the target detection elements in the two processing images may be obtained. The position parameter information may be compared with parameter information of the endpoints of the second constraint model to obtain at least two deviation angles of the at least two processing images with the second constraint model.

The mean value of the deviation angles may be calculated according to the at least two deviation angles. Meanwhile, the corresponding weights may be set for the corresponding processing images according to the magnitudes of the at least two deviation angles. The weights may be also determined according to a difference between the deviation angles and the mean value of the deviation angles or the experience of the technicians. Then, a third image rotation matrix of the adjusted processing image may be calculated according to the mean value of the deviation angles. The adjusted processing image may be rotated again according to the third image rotation matrix and the corresponding weight to generate the target image.

Figure 5:
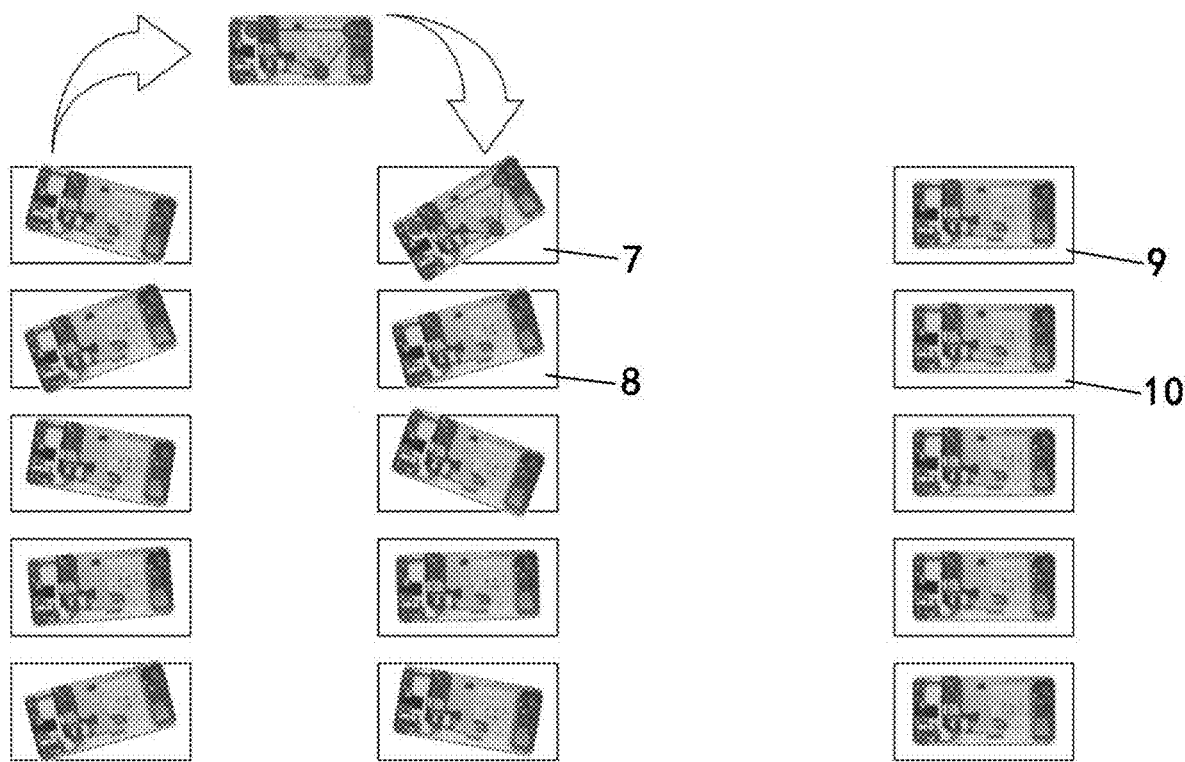
FIG. 5 illustrates still another schematic diagram of a processing method according to some embodiments of the present disclosure.

In some embodiments, referring to FIG. 5, when the adjusted processing image includes at least processing image 7 and processing image 8, position parameter information of the target detection elements in the processing image 7 and the processing image 8 is obtained. The obtained position parameter information is compared with the parameter information of the endpoints of the second constraint model of the sample image to obtain two deviation angles between the processing image 7 and the processed image 8 and the second constraint model, respectively. A mean value of the deviation angles is calculated according to the two deviation angles. Corresponding weights for the corresponding processing images are set according to the magnitudes of the at least two deviation angles. For example, if the deviation angle of the processing image 7 is larger than the deviation angle of the processing image 8, the weight corresponding to the processing image 7 may be set to 0.6. The weight corresponding to the processing image 8 may be set to 0.3. Then, the third image rotation matrixes of the adjusted processing image 7 and the processing image 8 may be calculated according to the mean value of the deviation angles. The adjusted processing image 7 and the adjusted processing image 8 may be rotated again according to the third image rotation matrixes and the corresponding weights, respectively, to generate target image 9 and target image 10.

Figure 6:
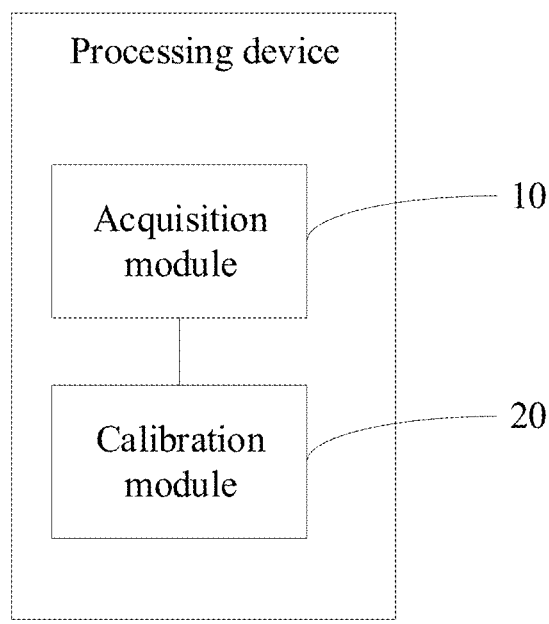
FIG. 6 illustrates a schematic block diagram of a processing device according to some embodiments of the present disclosure.

Based on a same concept, the present disclosure further provides a processing device. FIG. 6 illustrates a schematic block diagram of the processing device according to some embodiments of the present disclosure. As shown in FIG. 6, a display device includes an acquisition module 10 and a calibration module 20.

The acquisition module 10 may be configured to obtain a processing image of the apparatus that needs to be tested. The processing image may be obtained by performing first processing on the initial image of the apparatus that needs to be tested. The first processing at least includes performing scale processing on the initial image according to the defect parameter corresponding to the initial image.

The calibration module 20 may be configured to perform second processing on the processing image to generate a target image to perform analysis on the target image in the target defect detection method to realize the defect detection of the apparatus that needs to be tested.

The processing device of embodiments of the present disclosure can implement the processing method provided by any embodiment of the present disclosure through the functional modules of the processing device.

Furthermore, although exemplary embodiments have been described in the present disclosure, the scope of embodiments includes any and all embodiments based on equivalent apparatuses, modifications, omissions, combinations (e.g., solutions with intersection of various embodiments), modifications, or changes of the present disclosure. The apparatuses in the claims are explained broadly based on the language employed in the claims, and are not limited to the examples described in the present specification or embodiments of the present disclosure. The examples are non-exclusive. Therefore, the present specification and examples are intended to be regarded as examples only. The actual scope and spirit are indicated by the following claims along with their full scope of equivalents.

The above description is intended to be illustrative not restrictive. For example, the above examples (or one or more solutions) may be used in combination with each other. For example, other embodiments may be used by those of ordinary skill in the art upon reading the above description. In addition, in the above detailed description, various features may be grouped together to simplify the present disclosure. This should not be construed as an intention that an unclaimed disclosed feature is essential to any claim. Rather, the subject matter of the present disclosure may be less than all features of a particular disclosed embodiment. Thus, the following claims are hereby incorporated into the detailed description by way of example or embodiment. Each claim may be used as an independent embodiment. These embodiments may be grouped with each other with various groups or orders. The scope of the present invention should be determined with reference to the appended claims, along with the full scope of equivalents to which such claims are entitled.

A plurality of embodiments of the present disclosure are described in detail above, but the present disclosure is not limited to these specific embodiments. Those skilled in the art can make various modifications and changes to embodiments based on the concept of the present disclosure. These modifications and changes are within the scope of the present disclosure.

What is claimed is:

1. A processing method, comprising:
   obtaining a processing image of an apparatus, the processing image being obtained by performing a first processing on an initial image of the apparatus, and the first processing including performing scale processing on the initial image according to defect parameters corresponding to the initial image; and
   performing a second processing on the processing image to generate a target image to analyze the target image to realize defect detection;
   wherein:
   in response to an acquisition apparatus not storing the initial image of the apparatus, performing the scale processing on the initial image according to the defect parameters corresponding to the initial image includes:
  determining target resolution according to the defect parameters corresponding to the previewed initial image; and
  adjusting photographing parameters of the acquisition apparatus according to the target resolution to realize the scale processing on the previewed initial image, the acquisition apparatus being configured to collect an image of the apparatus; or
in response to the acquisition apparatus storing the initial image, performing the scale processing on the initial image according to the defect parameters corresponding to the initial image includes:
  determining a scale parameter according to the defect parameters corresponding to the stored initial image;
  adjusting the stored initial image according to the scale parameter to realize the scale process of the initial image.

2. The method according to claim 1, further comprising obtaining the initial image, including:
  determining a frame position of the apparatus by applying an apparatus detection model; and
  adjusting photographing parameters of the acquisition apparatus according to the frame position to obtain the initial image of the apparatus within a range corresponding to the photographing parameters.

3. The method according to claim 1, wherein performing the second processing on the processing image to generate the target image includes:
  performing element identification on the processing image to determine positions of at least two target detection elements; and
  performing endpoint matching on the positions of the at least two target detection elements through a first constraint model to determine positions of all target detection elements in the processing image.

4. The method according to claim 3, wherein performing the endpoint matching on the positions of the at least two target detection elements through the first constraint model includes:
  according to the positions of the at least two target detection elements, performing matching based on endpoints of the first constraint model and angles and side lengths corresponding to the endpoints, in response to the positions of the at least two target detection elements conforming to a relationship between the endpoints, the angles, and the side lengths, the processing image conforming to the first constraint model.

5. The method according to claim 4, wherein in response to the processing image conforming to the first constraint model, performing the endpoint matching on the positions of the at least two target detection elements through the first constraint model to determine the positions of all the target detection elements in the processing image includes:
  in response to an endpoint that cannot be matched with the at least two target detection elements existing in the first constraint model, determining that an unidentified target detection element exists in the processing image; and
  performing filling in operation on the unidentified target detection element according to the first constraint model to determine the positions of all the target detection elements in the processing image.

6. The method according to claim 1, wherein performing the second processing on the processing image to generate the target image includes:
  performing element identification on the processing image to determine positions of at least three target detection elements in the processing image; and
  according to the positions of the at least three target detection elements, rotating a corresponding angle of the processing image based on a second constraint model to adjust the angle of the processing image.

7. The method according to claim 6, wherein performing the second processing on the processing image to generate the target image further includes:
  comparing the positions of the at least three target detection elements in at least two adjusted processing images with the second constraint model to obtain deviation angles between the at least two processing images and the second constraint model, respectively;
  calculating a mean value of the deviation angles according to the deviation angles and set corresponding weights for the corresponding processing images according to magnitudes of the deviation angles; and
  rotating the adjusted processing images again according to the mean value of the deviation angles and the weights to generate the target image.

8. The method according to claim 1, wherein performing the scale processing on the initial image according to the defect parameters corresponding to the initial image includes:
  generating the defect parameters by using a defect prediction model according to a label parameter corresponding to the initial image; and
  determining a scale ratio according to the defect parameters to perform the scale processing on the initial image according to the scale ratio, the defect parameters including a downsampling number a, and the scale ratio being obtained based on $2^a$.

9. A processing device, comprising:
an acquisition module, configured to obtain a processing image of an apparatus, the processing image being obtained by performing a first processing on an initial image of the apparatus, and the first processing including performing scale processing on the initial image according to defect parameters corresponding to the initial image; and
a calibration module, configured to perform a second processing on the processing image to generate a target image to analyze the target image to realize defect detection of the apparatus;
wherein:
  in response to an acquisition apparatus not storing the initial image of the apparatus, the acquisition module is further configured to:
    determine target resolution according to the defect parameters corresponding to the previewed initial image; and
    adjust photographing parameters of the acquisition apparatus according to the target resolution to realize the scale processing on the previewed initial image, the acquisition apparatus being configured to collect an image of the apparatus; or
  in response to the acquisition apparatus storing the initial image, the acquisition module is further configured to:
    determine a scale parameter according to the defect parameters corresponding to the stored initial image;

adjust the stored initial image according to the scale parameter to realize the scale process of the initial image.

10. The device according to claim 9, wherein the acquisition module is further configured to:
   determine a frame position of the apparatus by applying an apparatus detection model; and
   adjust photographing parameters of the acquisition apparatus according to the frame position to obtain the initial image of the apparatus within a range corresponding to the photographing parameters.

11. The device according to claim 9, wherein the calibration module is further configured to:
   perform element identification on the processing image to determine positions of at least two target detection elements; and
   perform endpoint matching on the positions of the at least two target detection elements through a first constraint model to determine positions of all target detection elements in the processing image.

12. The device according to claim 11, wherein the calibration module is further configured to:
   according to the positions of the at least two target detection elements, perform matching based on endpoints of the first constraint model and angles and side lengths corresponding to the endpoints, in response to the positions of the at least two target detection elements conforming to a relationship between the endpoints, the angles, and the side lengths, the processing image conforming to the first constraint model.

13. The device according to claim 12, wherein when the processing image conforms to the first constraint model, the calibration module is further configured to:
   in response to an endpoint that cannot be matched with the at least two target detection elements existing in the first constraint model, determine that an unidentified target detection element exists in the processing image; and
   perform filling in operation on the unidentified target detection element according to the first constraint model to determine the positions of all the target detection elements in the processing image.

14. The device according to claim 9, wherein the calibration module is further configured to:
   perform element identification on the processing image to determine positions of at least three target detection elements in the processing image; and
   according to the positions of the at least three target detection elements, rotate a corresponding angle of the processing image based on a second constraint model to adjust the angle of the processing image.

15. The device according to claim 14, wherein the calibration module is further configured to:
   compare the positions of the at least three target detection elements in at least two adjusted processing images with the second constraint model to obtain deviation angles between the at least two processing images and the second constraint model, respectively;
   calculate a mean value of the deviation angles according to the deviation angles and set corresponding weights for the corresponding processing images according to magnitudes of the deviation angles; and
   rotate the adjusted processing images again according to the mean value of the deviation angles and the weights to generate the target image.

16. The device according to claim 9, wherein the calibration module is further configured to:
   generate the defect parameters by using a defect prediction model according to a label parameter corresponding to the initial image; and
   determine a scale ratio according to the defect parameters to perform the scale processing on the initial image according to the scale ratio, the defect parameters including a downsampling number a, and the scale ratio being obtained based on $2^a$.

* * * * *